United States Patent [19]

Tung et al.

[11] Patent Number: 4,678,695

[45] Date of Patent: Jul. 7, 1987

[54] ENCAPSULATED FLATTOP RETROREFLECTIVE SHEETING AND METHOD FOR PRODUCING THE SAME

[75] Inventors: Chi F. Tung, Mahtomedi; Chester A. Bacon, Jr., Oakdale, both of Minn.

[73] Assignee: Minnesota Mining and Manufacturing Company, St. Paul, Minn.

[21] Appl. No.: 812,523

[22] Filed: Dec. 23, 1985

[51] Int. Cl.[4] ............... B32B 7/00; B32B 15/00; G02B 5/124; G02B 5/128
[52] U.S. Cl. ................... 428/120; 428/325; 428/433
[58] Field of Search .......... 428/120, 325, 433, 434, 428/442, 912.2, 913; 350/103, 105

[56] References Cited

U.S. PATENT DOCUMENTS

| | | |
|---|---|---|
| 2,948,191 | 8/1960 | Hodgson, Jr. et al. |
| 3,005,382 | 10/1961 | Weber . |
| 3,190,178 | 6/1965 | McKenzie . |
| 3,222,204 | 12/1965 | Weber et al. . |
| 3,836,227 | 9/1974 | Holmen et al. ............ 350/105 |
| 4,025,159 | 5/1977 | McGrath . |
| 4,049,337 | 9/1977 | Eigenmann ............... 350/105 |
| 4,055,377 | 10/1977 | Erickson et al. ........... 350/105 |
| 4,075,049 | 2/1978 | Wood ...................... 156/220 |
| 4,082,426 | 4/1978 | Brown ..................... 350/105 |
| 4,102,562 | 7/1978 | Harper et al. ............. 350/105 |
| 4,496,618 | 1/1985 | Pernicano ................. 428/201 |
| 4,511,210 | 4/1985 | Tung et al. ............... 350/105 |
| 4,555,161 | 11/1985 | Rowland ................... 350/103 |
| 4,605,461 | 8/1986 | Ogi ........................ 156/233 |

FOREIGN PATENT DOCUMENTS

| | | |
|---|---|---|
| 463883 | 3/1950 | Canada ..................... 350/105 |
| 763291 | 7/1967 | Canada ..................... 350/105 |
| 2522710 | 1/1976 | Fed. Rep. of Germany . |
| 0038508 | 3/1980 | Japan . |
| 1390605 | 4/1975 | United Kingdom . |
| 1443618 | 7/1976 | United Kingdom . |

Primary Examiner—John E. Kittle
Assistant Examiner—Patrick J. Ryan
Attorney, Agent, or Firm—Donald M. Sell; James A. Smith; Robert H. Jordan

[57] ABSTRACT

A hermetically sealed retroreflective sheeting having improved resistance to delamination and improved brightness comprising a monolayer of microspheres supported in a layer of binder material, a layer of reflective material disposed behind said microspheres, and a cover film disposed in spaced relation in front of the microspheres. The cover film is in, at most, tangential contact with the microspheres. The binder material forms a network of walls surrounding individual microspheres and is in adherent contact with the cover film. Each microsphere is "exposed", i.e., air-incident.

15 Claims, 13 Drawing Figures

ENCAPSULATED FLATTOP RETROREFLECTIVE SHEETING AND METHOD FOR PRODUCING THE SAME

FIELD OF INVENTION

This invention concerns an improved encapsulated, flattop retroreflective sheeting and methods for producing such sheeting.

BACKGROUND ART

Hodgson et al., U.S. Pat. No. 2,948,191, discloses a sphere-based retroreflective sheeting wherein a transparent cover film is anchored in spaced relation to the microspheres at a sufficient distance to provide an air interface thereto.

McKenzie, U.S. Pat. No. 3,190,178, discloses the first commercial form of sphere-based, encapsulated type retroreflective sheeting, which comprises a base sheet in which a dense monolayer of transparent microspheres is partially embedded and partially exposed with a specular reflective metal layer underlying the embedded surfaces of the microspheres; a transparent cover film disposed in spaced relation above the layer of microspheres; and a network of narrow, intersecting polymer based bonds that extend over the surface of the base sheet to adhere the base sheet and cover film together and to divide the space between the base sheet and cover film into hermetically sealed cells or pockets in which the microspheres have an air interface. Such sheeting, which is also known as cellular sheeting, is an "exposed-lens" construction, that is, the microspheres partially protrude from a binder layer and have an air interface. Such a construction gives the sheeting a bright retroreflection, brighter than any other known commercial microsphere-based reflective sheeting.

McGrath, U.S. Pat. No. 4,025,159, teaches an improved version of an encapsulated or cellular sheeting as described above in which improved adhesion to the cover film is obtained through use of appropriate curable binder materials.

In the sheetings taught in both McKenzie and McGrath, there is loss of reflective brightness in the areas occupied by the network of bonds, since in those areas the glass microspheres are swallowed up or embedded in binder material which takes away the needed optical relationships for the microspheres to reflect light.

Wood, U.S. Pat. No. 4,075,049, discloses a method of preparing sphere-based, hermetically sealed retroreflective sheeting having improved resistance to delamination under varying conditions of use. This is accomplished, in part, by imposing a grid pattern on a monolayer of microspheres to provide spacings or essentially clear pathways for flow of resinous material which then bonds or links the overlay film to the sphere binder layer. The brilliance of the sheeting of Wood is reduced because of the nonreflectance of the areas where the microspheres are removed to provide the spacings for the flow of resinous material.

SUMMARY OF INVENTION

An object of this invention is to provide an encapsulated, hermetically sealed flattop retroreflective sheeting having improved resistance to delamination under varying conditions of use as well as improved retroreflective brightness. These and other objects, features, and advantages of the invention will become apparent from the following description.

These objectives are achieved in a new retroreflective sheeting which, in brief summary, comprises a monolayer of microspheres supported in a layer of binder material, a layer of reflective material disposed behind the microspheres, a cover film disposed in spaced relation in front of the microspheres, and additional binder material formed into a network of walls extending from the layer of binder material into adherent contact with the cover film, with at least some microspheres being individually surrounded by the walls.

Such a sheeting can be made by laminating together a cover film and a base sheet that comprises a monolayer of microspheres partially embedded in a conformable binder material with the lamination being performed in such a way that the binder material is extruded between individual microspheres into adherent contact with the cover film without flowing over or covering up the front portion of the microspheres. In this novel construction, the front surface of each microsphere surrounded by the walls of binder material is exposed or air-incident. High brightness is achieved because substantially all of the microspheres have an air interface, having, at most, tangential contact with the cover film, to provide the necessary optical relationships for efficient reflection and microspheres can be distributed over the full area of the sheeting. Excellent resistance to delamination is attained because bonds between the cover film and the layer of binder material may be formed around substantially all of the individual microspheres if desired.

Several advantages accrue from the novel construction of the invention in addition to the noted brightness and resistance to delamination. For example, an embodiment of the invention in which the binder material has been extruded to contact the cover film over substantially the entire surface of the sheeting makes more efficient use of microspheres along the cut edges of the sheeting. In such an embodiment each hermetically sealed cell comprises essentially only one microsphere. In typical cellular retroreflective sheeting, as in McKenzie, U.S. Pat. No. 3,190,178, or McGrath, U.S. Pat. No. 4,025,159, for instance, each cell comprises at least several hundred microspheres, therefore when the sheeting is cut to desired size and one or more of the hermetically sealed cells or pockets thereby breached, several hundred microspheres are left subject to such effects as moisture penetration which reduces or destroys retroreflective efficiency of the cell. This embodiment of the novel sheeting of this invention does not suffer to the same extent from that loss of retroreflective efficiency around the edges of the sheeting when it is cut or trimmed to desired size, because each breached cell comprises essentially one microsphere.

In another embodiment, sheeting of this invention is made with the binder material extruded into adherent contact with the cover film in only selected areas, such as in a hexagonal network pattern, rather than across substantially the entire area of the sheeting. Such sheeting has higher angularity of reflective response than the fully extruded embodiment discussed above, because in the unextruded areas or cells, individual microspheres are not surrounded by walls which can block light rays at high incidence angles from reaching the microspheres. Angularity of reflective response refers to the relative reflective efficiency at increasing angles of incidence from a perpendicular or head on view (0° angle of incidence). The half brightness angle, i.e., the angle at which the reflective efficiency is one-half that of head-on, can be increased from approximately 30° in a fully extruded embodiment to approximately 63° in a cellular embodiment of the sheeting of the invention which comprises the same microspheres, cover film, reflective materials and other components. The optimum angularity will be determined by the desired application. For instance, sheeting with low angularity will typically be useful for traffic signs at intersections where it is desirable for the sign to be visible from only one approaching lane. Alternatively, it will normally be desirable for a road sign along an isolated freeway to have a wider angularity.

DETAILED DESCRIPTION OF INVENTION

Suitable binder materials include thermoplastic, heat-activated, UV cured, or E-beam cured adhesives, and other materials which may be extruded between individual microspheres into adherent contact with the cover film without drowning the microspheres. The binder material should be compatible with and adhere securely to the cover film to produce a sheeting with a high resistance to delamination. If desired, a, clear binder material may be used to make a translucent sheeting or it can be impregnated with a white pigment to improve daytime color. Because the binder material may be extruded between individual microspheres without interfering with their reflectivity, the invention provides a brightly reflective sheeting with a more brilliant white daytime color than could earlier be achieved. Alternatively, a colored pigment may be used to provide sheeting with the corresponding daytime color and silver nighttime reflection.

Suitable cover films may be made of such materials as acrylates, polymethylmethacrylates, polycarbonates, polyesters, nylons, polyvinylchlorides, or polyurethanes, among others. In order to be useful as a cover film, a material should be transparent and have a higher melting point than the binder material which is used. The optimum thickness and flexibility of a cover film are determined by the ultimate application for which the sheeting is being made. If desired, the cover film may be tinted to provide a colored sheeting which will have the corresponding daytime color and nighttime reflection, or some message such as a logo may be printed thereon before lamination.

The attached drawing diagramatically illustrates the principal steps of three methods for forming the novel sheeting of the invention. The FIGURES are illustrative only and are not drawn to scale.

Figure 1:
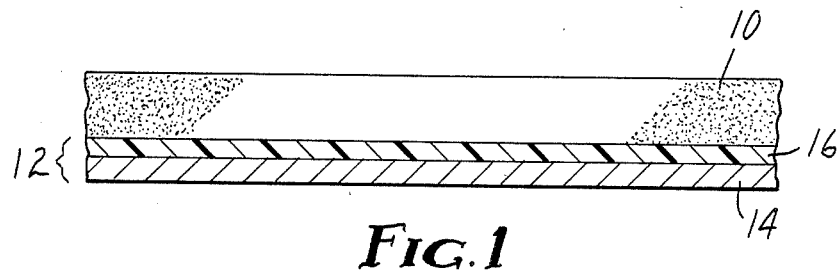
FIGS. 1-5 are cross-sectional views showing an embodiment of the invention during stages of one method of manufacture.

FIG. 1 illustrates step (a) of one process. With reference thereto, a layer 10 of binder material, such as a heat activated adhesive, is coated on a release sheet 12 by any convenient method, such as solution coating or extrusion. The release sheet should be a flexible or conformable material. Suitable release sheets may comprise a paper substrate 14 or equivalent backing material with a polyethylene coating 16. The binder material is preferably coated to a thickness equal to approximately 25 to approximately 80 percent of the diameter of the microspheres. If the thickness of the binder material is substantially less than that range, there may be insufficient binder material to securely bond the microspheres to the cover film. If the binder material is coated substantially more thickly than that, it will be difficult or impossible to laminate the composite so as to expose the rear surfaces of the microspheres without drowning the front surfaces thereof.

In step (b), glass microspheres 18 are arranged in a monolayer on the layer of binder material 10 and embedded therein. The microspheres preferably have a substantially uniform diameter, and an average diameter of approximately 65 microns. Microspheres having median diameters of from 30 to 500 microns, or even beyond, may be useful depending upon the particular application.

Figure 2:
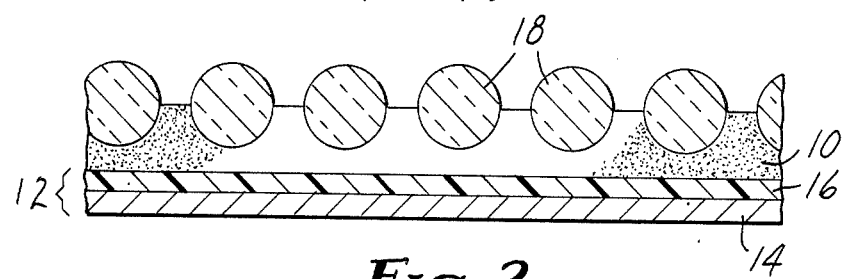

The microspheres may be arranged on the binder material in an appropriately spaced monolayer by any convenient selective transfer process, such as printing, transferring, screening, cascading, or with a hot can roll, and are typically embedded to a depth equal to about 40 to about 60 percent of their average diameter. Because microspheres tend to link together in random networks that may interfere with uniformity of the reflective properties of the finished sheeting and proper extrusion of the binder material, it will typically be convenient that they first be surface treated with an agent such as a silicone or fluorocarbon material to inhibit them from linking together. The gaps between the microspheres are preferably equivalent to from approximately 1 to approximately 40 percent of the average diameter of the microspheres. If the microspheres are packed substantially more densely together than that range, the resultant sheeting's resistance to delamination is lowered. Packing the microspheres less densely tends to reduce the brightness of reflectivity of the resultant sheeting. FIG. 2 is an illustration of the construction provided by step (b). The microspheres do not need to be uniformly spaced and are shown that way in FIG. 2 merely for convenience.

Figure 3:
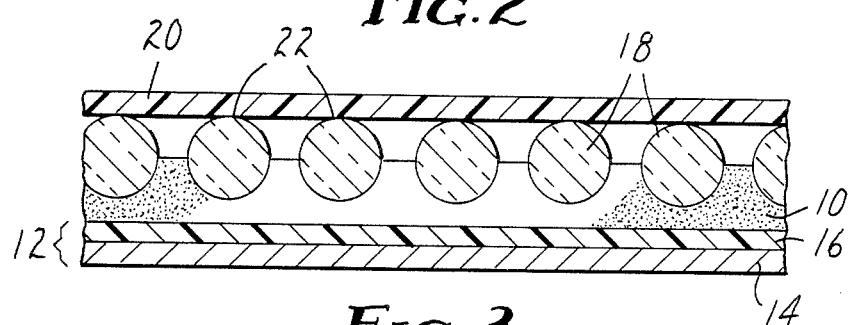

In step (c), illustrated in FIG. 3, a cover film 20 is laid across the exposed surface of the microspheres 18. Because the microspheres preferably have substantially uniform diameters and are embedded to substantially uniform depths in the layer of binder material 10, the cover film, which is planar, will be in tangential contact 22 with substantially all of the microspheres.

Figure 4:
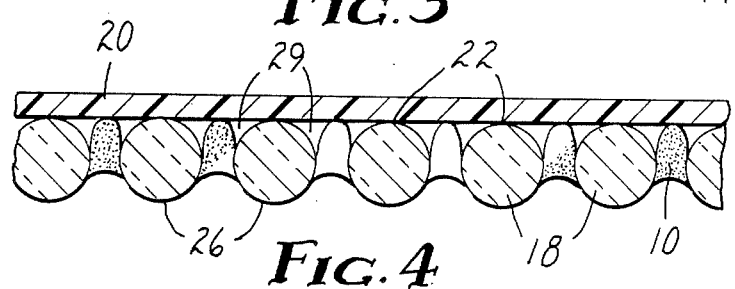

In step (d), the assembled composite is laminated with controlled heat and pressure. The binder material 10 flows between the microspheres 18 to contact the cover film 20 and adhere thereto. The depth to which the binder material 10 is coated in step (a) is selected so that after lamination, there is sufficient binder material to adhere the microlenses 18 to the cover sheet 20 while exposing the back surfaces 26 of the microspheres as shown in FIG. 4. The surface of the release sheet 12, shown here as a polyethylene coating 16, must be flexible in order to conform to the contour of the microspheres thereby forcing the binder material clear of the back surfaces of the microspheres during the lamination. If it is heat-conformable, it should have a melting point that is higher than the temperature required to cause the binder material to flow between the microspheres. The lamination may be performed with such means as steel or rubber rolls. The front surfaces 29 of the microspheres 18 remain uncovered by the binder material and each microsphere is secured to the other microspheres and to the cover film 20 by the binder material 10.

In step (e), after removal of the release sheet 12, the exposed rear surfaces 26 of the microspheres 18 are covered with a light reflecting material to form a reflective layer 27. Among the variety of materials which may be used for this purpose are vacuum deposited metal coatings, such as silver or aluminum, chemically deposited metal coatings, such as silver, metal foils, metal-coated plastic films, and dielectric coatings. While silver reflective coatings, which can be chemically deposited, provide a preferred reflective color to that of aluminum, an aluminum vapor coat is nevertheless normally preferred, because silver reflective coatings typically suffer more severe degradation in outdoor exposure than do aluminum coatings. Further, although the initial cost of aluminum vapor coating equipment is higher than equipment for the chemical deposition of silver, its operating cost is lower and faster rates of deposition may be achieved with a dry, clean process. Chemical deposition is typically employed where the sophisticated equipment and know how that vacuum deposition and vapor coating techniques require are unavailable.

Figure 5:
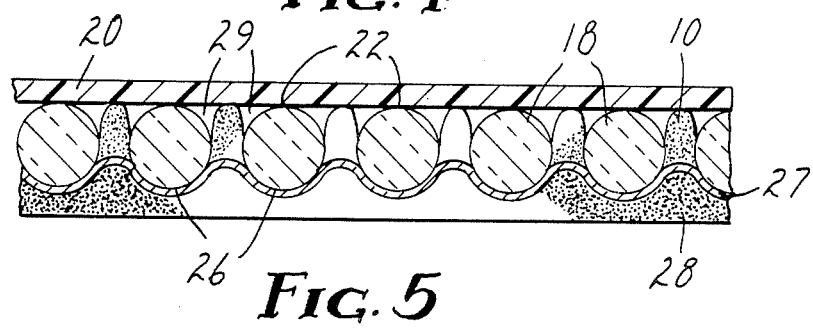

If desired, an adhesive coat 28 may be applied to the rear side of the reflective layer 27. This adhesive coat enables the resultant film to be adhered to a desired surface, such as a traffic barrier or sign. This final construction is illustrated in FIG. 5.

Figure 6:
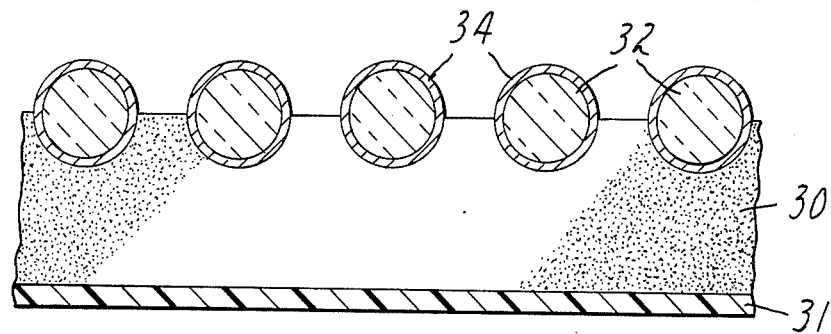
FIGS. 6-8 are cross-sectional views showing an embodiment of the invention during stages of another method of manufacture.
Figure 7:
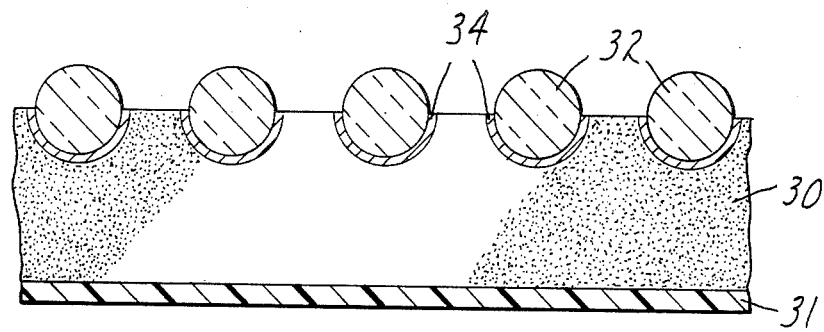
Figure 8:
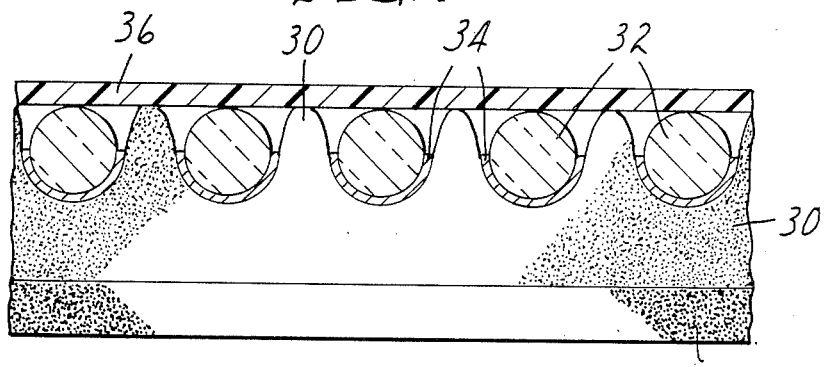

An alternative embodiment of the sheeting of this invention may be made using microspheres which have a reflective coating. For instance, silver-coated microspheres may be used to provide a sheeting well-suited to daytime use. The method for forming this embodiment of the novel sheeting is illustrated in FIG. 6–8.

In steps ($a_1$) and ($b_1$) a binder material 30 is coated on a release sheet 31 and a monolayer of the microspheres 32 having a reflective coating 34 are embedded therein. The microspheres are typically embedded in the binder material 30 to an extent of about 40 to about 60 percent of their diameters.

The preferred thickness of the layer of binder material is approximately 25 to approximately 80 percent of the diameter of the microspheres. At these thicknesses the release sheet 31 should be conformable as described in the first method of manufacture discussed above. If the thickness of binder material is greater, as shown in FIG. 6, the release sheet need not be a conformable material.

In step ($c_1$) the reflective coating 34 is etched from the portions of the microspheres 32 which protrude from the binder material 30. The depth to which the microspheres are embedded determines the portion of the microspheres which remains coated. As illustrated in FIG. 7, the reflective coating 34 on the embedded portions of the microspheres remains intact.

Steps ($d_1$) and ($e_1$) comprise placing a cover film 36 across the exposed front surface of the microspheres 32 and extruding the binder material 30 between the microspheres into adherent contact with the cover film. In this method of manufacture the binder material does not need to be pressed away from the back surfaces of the microspheres; therefore, if the binder material has been coated to a thickness greater than approximately the diameter of the microspheres, the release sheet 31 need not be conformable, but the lamination must be controlled so that a sufficient amount of binder material to drown the front surfaces of the microspheres is not extruded between them. The lamination may be controlled by maintaining pressure for only the time required to extrude the desired amount of binder material, or more conveniently, by adjusting the gap or nip distance employed such that when sufficient binder material is extruded, the thickness of the sheeting has been reduced such that the sheeting will pass through the gap without further pressure.

If desired, an adhesive coat 38 may be applied to the back surface of the layer of binder material 30 or to the back surfaces of the microspheres after the release sheet has been removed to produce the construction illustrated in FIG. 8.

A third embodiment of this invention may be formed according to the following procedure which is illustrated in FIGS. 9–13.

Figure 9:
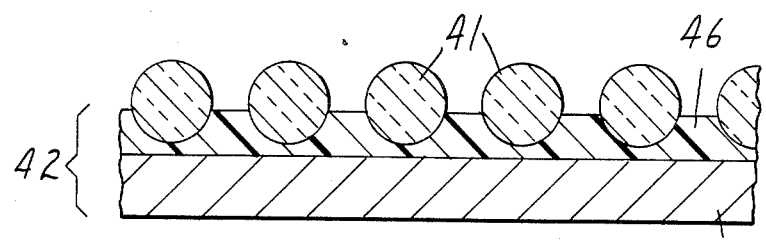
FIGS. 9-13 are cross-sectional views showing an embodiment of the invention during stages of a third method of manufacture.
Figure 10:
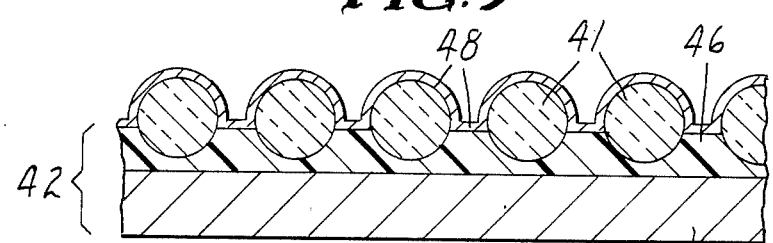

In step ($a_2$), illustrated in FIG. 9, glass microspheres 41 are arranged in a monolayer with the desired spacing on a temporary carrier sheet 42, such as a polyethylene 46 lined sheet 44. The microspheres are embedded in the polyethylene to approximately 20 to approximately 50 percent of their diameter while applying heat sufficient to soften the polyethylene 46.

A reflective coating 48, such as a thin aluminum vapor coat, is then applied to the exposed surface of the microspheres 41 in step ($b_2$).

Figure 11:
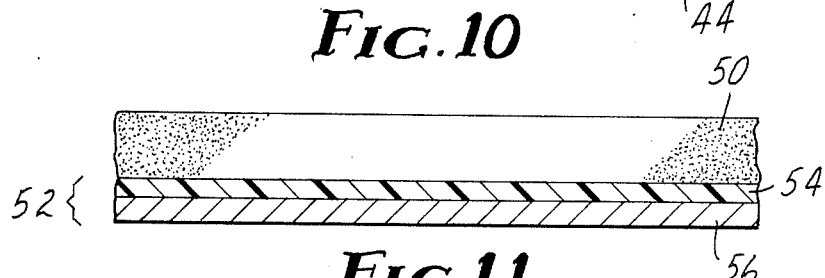

Step ($c_2$), illustrated in FIG. 11, comprises coating a layer of binder material 50 onto a release sheet 52 which typically may comprise a layer of polyethylene 54 with a paper backing 56. The binder material is preferably coated to a thickness equal to approximately 25 percent or more of the diameter of the microspheres to ensure that the microspheres will be securely bonded to the cover film. If the thickness is within the ideally preferred range of about 25 to about 80 percent of the diameter, the release sheet 52 should be a conformable material. If the thickness is greater than the preferred range, the release sheet need not be conformable, but the lamination conditions must be more tightly controlled to ensure that the front surfaces of the microspheres are not drowned, as described above in reference to the second method of manufacture.

In step ($d_2$), the temporary carrier sheet 42 bearing the monolayer of microspheres 41 and reflective coating 48 is gently contacted to the layer of binder material 50 with low heat and little pressure. The vapor coated microspheres are typically embedded to approximately 25 percent of their diameter into the binder material but, in any event, not to the extent that there is any contact between the binder material and the portion of the reflective coating between the microspheres. When the temporary carrier sheet 42 is stripped away, the reflective coating which was deposited on the temporary carrier sheet between the microspheres 41 remains on it. A similar transfer process is disclosed in Example 3 of Weber, U.S. Pat. No. 3,005,382, at column 7, line 61 to column 8, line 8. If the reflective coating between the microspheres is also transferred to the binder material, the resultant sheeting will have a gray or silver appearance and the coating may hinder the extrusion of the binder material between the microspheres and interfere with its adhesion to the cover film.

Figure 12:
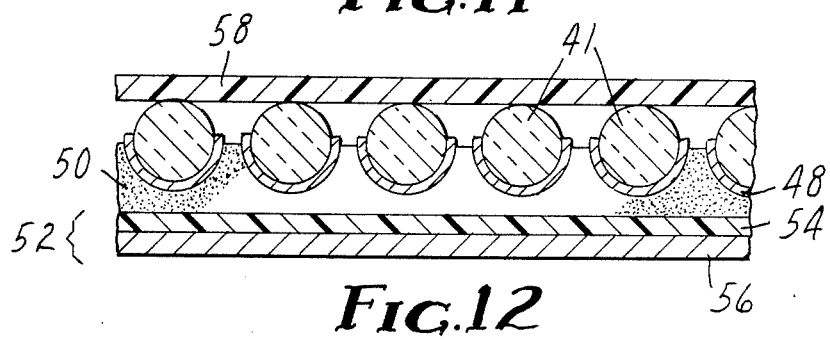

In step ($f_2$), the cover film 58 is placed across the exposed surface of the microspheres 41 as illustrated in FIG. 12. The composite is then laminated, in step ($g_2$), as described above in steps (d₁) and (e₁) of the second method of manufacture.

Figure 13:
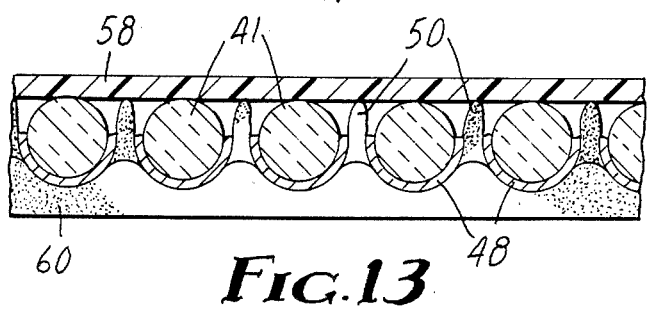

If desired, after the release sheet 52 is stripped away an adhesive layer 60 may be applied to the rear surface of the laminate so that it may be attached to a desired surface. FIG. 13 illustrates this final construction.

The first method described above comprises application of the reflector coat after encapsulation of the microspheres, therefore, there is no reflector coat to contend with when the binder material is extruded. The second method described may be used to provide sheeting having brighter reflection and a whiter daytime appearance. Because silvered microspheres are used, no vapor coating equipment is required. The third method described is the most practical for using vapor coating equipment because the aluminum reflective coating is applied to virgin microsphere surface as distinct from the first method wherein the binder material must be cleared from the back surfaces of the microspheres before deposition of the reflective coating.

EXAMPLE 1

SCOTCH-GRIP Brand Plastic Adhesive 2262, an adhesive comprising an acrylate terpolymer and a butadiene/acrylonitrile copolymer in acetone and tetrahydrofuran, available from the Minnesota Mining and Manufacturing Company of St. Paul, Minnesota, ("3M") was bar coated through a 4 mil orifice onto MGT-21, a polyethylene coated paper formerly available from Thillmany Pulp and Paper Company of Kaukauma, Wisconsin.

Glass microspheres having an average diameter of about 65 microns and a refractive index of 1.9 were surface treated with 3MFC805, a chromium complex of a long chain fluorochemical available from 3M. Eight cubic centimeters of a one percent aqueous solution of 3MFC805, which is disclosed in Weber et al., U.S. Pat. No. 3,222,204, were stirred into a beaker containing 100 grams of the microspheres and allowed to dry. The surface-treated microspheres were cascaded onto the adhesive-coated release sheet in substantially a monolayer. In addition to inhibiting the microspheres from sticking together, surface treatment with 3MFC805 causes them to float in the less dense adhesive or binder material rather than submerging.

This construction was dried for 2 minutes at 150° F. and 4 minutes at 200° F. in an air dried oven to drive off the acetone and tetrahydrofuran solvents in the EC2262 adhesive. The microspheres were embedded to approximately 50 percent of their diameter and substantially free of contact with each other.

A top film of polymethylmethacrylate was laid across the top of the microspheres and the construction then laminated by passing it between a rubber top roll at room temperature and an oil-heated, approximately 250° F., steel bottom roll under approximately 50 pounds per square inch pressure at approximately 10 feet per minute. The release sheet was then stripped away to reveal the exposed rear surfaces of the microspheres.

The sheet was placed in a chamber under a vacuum of approximately $10^{-5}$ torr, and an aluminum vapor coat approximately 900 angstroms thick applied to the exposed rear surfaces of the microspheres and binder material.

The resultant sheeting had a head-on brightness of approximately 300 candelas per square meter per lux. Its brightness at approximately 30° to 35° from head-on was equal to three quarters of its head-on brightness.

EXAMPLE 2

SCOTCH-GRIP Brand Adhesive EC1781, an adhesive comprising synthetic rubber and a polyvinyl chloride resin in acetone, available from 3M, was bar coated through a 9 mil orifice onto the same kind of polyethylene coated paper used in Example 1.

Approximately 20 grams of glass microspheres having an average diameter of about 65 microns and a refractive index of 1.9 were immersed in a gilding solution of 1 gram of stannous chloride, 4 cubic centimeters of hydrochloric acid, and 100 cubic centimeters of water for approximately 2 minutes, then rinsed well with distilled water.

A deposition solution was prepared by dissolving 1 gram of silver nitrate in 100 cubic centimeters of water. The slightly cloudy solution was then titrated dropwise with ammonium hydroxide until clear. One gram of potassium hydroxide was dissolved in the solution, whereupon it again turned cloudy, and it was again titrated dropwise with ammonium hydroxide until clear.

The microspheres were added to the solution and 1 gram of dextrose was dissolved therein to initiate the deposition. The solution and microspheres were stirred continuously for five minutes. The depleted solution was drained off and the microspheres were rinsed with distilled water and dried with forced air.

The silvered microspheres were then surface treated and cascaded onto the adhesive-coated release sheet in substantially a monolayer as in Example 1.

This construction was then dried as in Example 1 to drive off the acetone solvent in the EC1781 adhesive. The microspheres were embedded to approximately 50 percent of their diameter and substantially free of contact with each other.

The exposed portion of the silver coating was then etched from the glass microspheres with a solution of 1.24 grams of potassium dichromate, 2.4 milliliters of sulfuric acid, and 15 milliliters of water. The etching solution was rinsed across the sheeting for approximately 15 to 20 seconds followed by a water rinse. The sheeting was then dried with forced air.

An acrylic top film was laid across the exposed microspheres. This construction was then laminated by passing it between a rubber top roll at room temperature and an oil-heated, approximately 200° F., steel bottom roll under approximately 35 pounds per square inch pressure at a rate of approximately 10 feet per minute.

The release sheet was then stripped off, and the laminate heated to 300° F. in an electric oven for 3 minutes to ensure proper adhesion of the binder to the top film.

The resultant sheeting, which had a structure as shown in FIG. 8, had a head-on brightness of approximately 400 candelas per square meter per lux.

EXAMPLE 3

Glass microspheres having an average diameter of 65 microns and a refractive index of 1.9 were heated to approximately 200° F. and cascaded onto a temporary carrier sheet of the same kind of polyethylene coated paper used in Examples 1 and 2.

The construction was heated to 300° F. for 30 seconds, thereby softening the polyethylene so that the microspheres were drawn into the polyetheylene to about 35 percent of their diameter by gravity and capillary forces.

In a vacuum chamber, aluminum was deposited over the monolayer of glass microspheres to a thickness of about 900 angstroms as in Example 1.

The same resin used in Example 2 was bar coated onto a similar polyethylene coated paper as used in Example 2. This release sheet was dried as in Examples 1 and 2.

The adhesive-coated side of the dried release sheet was laminated to the reflective coated microspheres by passing the construction between two rubber rollers heated to approximately 200° to 250° F. at approximately 30 to 40 feet per minute under a pressure of approximately 10 pounds per square inch.

The temporary carrier sheet was stripped from the laminate. The aluminum vapor coat which had been deposited between the microspheres remained on the temporary carrier sheet while the glass microspheres and the reflective coating on the back side thereof remained partially embedded in the adhesive-coated release sheet.

An acrylic top film was then laid across the exposed microspheres. This construction was then laminated by passing it between a rubber top roll at room temperature and an oil-heated, approximately 200° F., steel bottom roll under approximately 35 pounds per square inch pressure at a rate of approximately 10 feet per minute.

The release sheet was then stripped off, and the laminate heated to 300° F. in a steam heated oven for 3 minutes to ensure proper adhesion of the binder to the top film.

The resultant sheeting, which had a structure as shown in FIG. 13, had a head-on brightness of approximately 380 candelas per square meter per lux, and a half brightness angle of approximately 35°.

EXAMPLE 4

A retroreflective sheeting was prepared according to Example 3, except the extrusion of the binder material between the microspheres to the top film was done with a stencil. The stencil, a sheet of thick metal foil in a hexagonal pattern of 3/32 inch walls surrounding ¼ inch cut out hexagons, was passed between the rubber and steel rollers with the laminate so that the binder material was extruded in a pattern corresponding to the walls.

The resultant sheeting had substantially the same head-on brightness as in Example 3, but had a half brightness angle of approximately 57°.

What is claimed is:

1. A retroreflective sheet comprising a monolayer of microspheres supported in a layer of binder material, a layer of reflective material disposed behind said microspheres, and a cover film disposed in spaced relation in front of said microspheres, wherein additional binder material forms a network of walls extending from said layer of binder material into adherent contact with said cover film and at least some microspheres are individually surrounded by said walls.

2. A retroreflective sheet as described in claim 1 wherein said microspheres have an index of refraction of approximately 1.7 to 2.0.

3. A retroreflective sheet as described in claim 1 wherein said microspheres have an average diameter of from about 30 to about 500 microns.

4. A retroreflective sheet as described in claim 1 wherein said network of walls is provided in only some areas such that the network divides said retroreflective sheet into cells comprising areas with no walls surrounding individual reflective elements.

5. A retroreflective sheet as described in claim 1 wherein the back surfaces of said microspheres protrude from said layer of binder material and said layer of reflective material is deposited on said protruding portion of the microspheres.

6. A retroreflective sheet as described in claim 1 wherein essentially all of said microspheres are individually surrounded by said walls.

7. A method of preparing retroreflective sheeting comprising laminating together a cover sheet and a base sheet that comprises a monolayer of microspheres partially embedded in a binder material so that the binder material is extruded around at least some individual microspheres into adherent contact with the cover film without covering the front portions of the microspheres.

8. A method of preparing retroreflective sheeting comprising the steps of:
   (a) coating a layer of binder material onto a release sheet;
   (b) partially embedding a number of microspheres in said layer of binder material, said microspheres being spaced apart and being arranged in a monolayer;
   (c) placing a cover film across the exposed surface of the monolayer of microspheres; and
   (d) applying heat and pressure to extrude said binder material between at least some of said microspheres, said binder material being forced into adherent contact with said cover film and binding said microspheres thereto, but leaving the front surfaces of said microspheres uncovered by binder material.

9. A method of preparing retroreflective sheeting as described in claim 8, wherein extruding said binder material in step (d) exposes the backsides of said microspheres, and further comprising after said step (d);
   (e) removing said release sheet and applying a reflective coating to the exposed rear surface of said microspheres.

10. A method of preparing retroreflective sheeting comprising the steps of:
    (a) coating a layer of binder material onto a release sheet;
    (b) partially embedding a number of microspheres in said layer of binder material, said microspheres being spaced apart and arranged in a monolayer, and having a reflective coating thereon;
    (c) removing said reflective coating from the portion of said microspheres which protrudes from said layer of binder material;
    (d) placing a cover film across the exposed surface of the monolayer of microspheres; and
    (e) applying heat and pressure to extrude said binder material between at least some of said microspheres, said binder material being forced into adherent contact with said cover film and binding said microspheres thereto, but leaving the front surfaces of said microspheres uncovered by binder material.

11. A method of preparing retroreflective sheeting comprising the steps of:
    (a) applying a monolayer of microspheres to a temporary carrier sheet;

(b) applying a reflective coating to the exposed surface of said monolayer of microspheres;

(c) coating a layer of binder material onto a release sheet;

(d) pressing the monolayer of microspheres into said binder material thereby partially embedding said microspheres in said binder material;

(e) removing said temporary carrier sheet;

(f) placing a cover film across the exposed surface of the monolayer of microspheres; and (g) applying heat and pressure to extrude said binder material between at least some of said microspheres, said binder material being forced into adherent contact with said cover film and binding said microspheres thereto, but leaving the front surfaces of said microspheres uncovered by binder material.

12. A retroreflective sheeting made by the method of claim 9.

13. A retroreflective sheeting made by the method of claim 10.

14. A retroreflective sheeting made by the method of claim 11.

15. A method of preparing retroreflective sheeting as defined in claim 7 wherein said binder material is extruded into adherent contact with said top film in only selected areas.

* * * * *

UNITED STATES PATENT AND TRADEMARK OFFICE
CERTIFICATE OF CORRECTION

PATENT NO. : 4,678,695

DATED : July 7, 1987

INVENTOR(S) : Chi F. Tung et al.

It is certified that error appears in the above-identified patent and that said Letters Patent is hereby corrected as shown below:

Col. 3, line 35, "If desired, a," should read --If desired, a--.

Col. 6, line 56, "deposted" should read --deposited--.

Signed and Sealed this

First Day of March, 1988

Attest:

DONALD J. QUIGG

*Attesting Officer*       *Commissioner of Patents and Trademarks*